United States Patent
Smirnov

(10) Patent No.: US 8,953,280 B2
(45) Date of Patent: Feb. 10, 2015

(54) SPINDLE MOTOR HAVING LABYRINTH SEALING PORTION AND HARD DISK DRIVE INCLUDING THE SAME

(71) Applicant: Samsung Electro-Mechanics Co., Ltd., Suwon (KR)

(72) Inventor: Viatcheslav Smirnov, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 16 days.

(21) Appl. No.: 13/800,942

(22) Filed: Mar. 13, 2013

(65) Prior Publication Data

US 2014/0160594 A1   Jun. 12, 2014

(30) Foreign Application Priority Data

Dec. 11, 2012   (KR) .................. 10-2012-0143968

(51) Int. Cl.

| | |
|---|---|
| G11B 19/20 | (2006.01) |
| G11B 25/04 | (2006.01) |
| H02K 7/08 | (2006.01) |
| F16C 17/10 | (2006.01) |
| F16C 33/74 | (2006.01) |

(52) U.S. Cl.
CPC ............ H02K 7/086 (2013.01); G11B 19/2009 (2013.01)

USPC .......... 360/99.08; 310/67 R; 310/90; 384/121

(58) Field of Classification Search
CPC . G11B 19/2009; G11B 19/2036; H02K 7/086
USPC ......... 360/99.08, 98.07, 99.04; 310/90, 67 R; 384/121
See application file for complete search history.

(56) References Cited

U.S. PATENT DOCUMENTS

| | | |
|---|---|---|
| 2008/0063332 A1 | 3/2008 | Yamamoto et al. |
| 2010/0315742 A1 | 12/2010 | Kimura et al. |
| 2012/0033328 A1 | 2/2012 | Mizukami et al. |

FOREIGN PATENT DOCUMENTS

| | | |
|---|---|---|
| JP | 2009-8200 | 1/2009 |
| JP | 2010-286071 | 12/2010 |

*Primary Examiner* — Craig A. Renner

(57) ABSTRACT

There is provided a spindle motor including: a shaft including a body portion having a fixing recess formed on a lower portion thereof, a flange portion extending in an outer radial direction from an upper portion of the body portion, and a first insertion portion extending downwardly from the flange portion in an axial direction; a lower thrust member including a fixed portion inserted into the fixing recess, a disk portion extending from the fixed portion in an outer radial direction, and first and second protrusion portions extending from the disk portion in the axial direction; a base member coupled to the second protrusion portion; and a rotating member forming a bearing clearance with the shaft and provided to be rotatable with respect to the shaft.

18 Claims, 13 Drawing Sheets

_US 8,953,280 B2_

SPINDLE MOTOR HAVING LABYRINTH SEALING PORTION AND HARD DISK DRIVE INCLUDING THE SAME

CROSS-REFERENCE TO RELATED APPLICATIONS

This application claims the priority of Korean Patent Application No. 10-2012-0143968 filed on Dec. 11, 2012, in the Korean Intellectual Property Office, the disclosure of which is incorporated herein by reference.

BACKGROUND OF THE INVENTION

1. Field of the Invention

The present invention relates to a spindle motor and a hard disk drive including the same.

2. Description of the Related Art

A so-called shaft fixed type spindle motor may be mounted in an information recording and reproducing apparatus such as a hard disk drive, or the like, in which a shaft resistant to vibration is fixed to a case of a hard disk drive.

Namely, in order to prevent recorded information from being damaged and a state in which information cannot be written or read due to external vibrations developing, a spindle motor installed in a hard disk drive may employ a structure in which a shaft is fixedly installed.

Meanwhile, a spindle motor used in a hard disk drive is required to have a high degree of reliability, so it is necessary to maintain a quantity of a lubricating fluid provided in a fluid dynamic bearing assembly having a fixed shaft.

In a case in which a lubricating fluid is released from a liquid-vapor interface formed by the lubricating fluid and air and leaked outwardly, rotational characteristics of the spindle motor may be degraded and a rotating member and a fixed member forming a bearing clearance may be abraded due to a shortage of lubricating fluid.

Thus, the development of a structure capable of preventing leakage of a lubricating fluid outwardly and securing sufficient storage space for lubricating fluid is required.

SUMMARY OF THE INVENTION

An aspect of the present invention provides a spindle motor in which an introduction of an external foreign object and leakage of a lubricating fluid are prevented by maximizing a labyrinth sealing effect, and a hard disk drive including the same.

Another aspect of the present invention provides a spindle motor having enhanced performance and lifespan by sufficiently securing a storage space for a lubricating fluid, and a hard disk drive.

Another aspect of the present invention provides a spindle motor including a reduced amount of internal components, thus simplifying a manufacturing process and reducing manufacturing costs, and a hard disk drive including the same.

According to an aspect of the present invention, there is provided a spindle motor including: a shaft including a body portion having a fixing recess formed on a lower portion thereof, a flange portion extending in an outer radial direction from an upper portion of the body portion, and a first insertion portion extending downwardly from the flange portion in an axial direction; a lower thrust member including a fixed portion inserted into the fixing recess, a disk portion extending from the fixed portion in an outer radial direction, and first and second protrusion portions extending from the disk portion in the axial direction; a base member coupled to the second protrusion portion; and a rotating member forming a bearing clearance with the shaft and provided to be rotatable with respect to the shaft, wherein a first recess portion accommodating the first insertion portion is provided in an upper portion of the rotating member and a second recess portion accommodating the first protrusion portion is provided in a lower portion of the rotating member, and an upper labyrinth sealing portion is provided between an outer edge of the flange portion and the rotating member.

A first fluid-vapor interface may be formed between an outer circumferential surface of the first insertion portion and an inner wall of the rotating member, and a second liquid-vapor interface may be formed between an outer circumferential surface of the first protrusion portion and an inner wall of the rotating member forming the second recess portion.

At least one of an inner circumferential surface, a lower surface, and an outer circumferential surface of the first insertion portion may be tapered.

At least one of an inner circumferential surface, an upper surface, and an outer circumferential surface of the first protrusion portion may be tapered.

A micro-clearance may be formed between an outer edge of the flange portion and a surface of the rotating member facing the outer edge of the flange portion.

A recess may be formed on at least one of a lower surface and a lateral surface of the outer edge of the flange portion.

The second protrusion portion may be formed at an outer side in a radial direction, relative to the first protrusion portion.

An accommodation recess may be provided between the first protrusion portion and the second protrusion portion, and a projection portion protruded from a lower portion of the rotating member may be accommodated in the accommodation recess.

A micro-clearance may be formed between the projection portion and the accommodation recess.

A lower labyrinth sealing portion may be formed between the projection portion and the accommodation recess.

An outer labyrinth sealing portion may be provided between an outer circumferential surface of the rotating member and a surface of the base member facing the outer circumferential surface of the rotating member.

The flange portion may further include a second insertion portion extending downwardly in the axial direction from the outer edge thereof, and the rotating member may further include a third recess portion accommodating the second insertion portion.

A micro-clearance may be formed between the second insertion portion and the third recess portion.

The second insertion portion may be formed at an outer side in the radial direction, relative to the first insertion portion.

The spindle motor may further include: a cover member fixed to an upper surface of the rotating member and preventing leakage of a lubricating fluid.

At least one recess may be formed on an upper surface of the flange portion and a lower surface of the cover member.

At least one bypass flow channel penetrating upper and lower portions of the rotating member may be formed in the rotating member.

According to another aspect of the present invention, there is provided a spindle motor including: a shaft including a body portion having a fixing recess formed on a lower portion thereof, a flange portion extending in an outer radial direction from an upper portion of the body portion, and a first insertion portion extending downwardly from the flange portion in an axial direction; a lower thrust member including a fixed portion inserted into the fixing recess, a disk portion extending from the fixed portion in an outer radial direction, a protrusion portion extending from the disk portion in the axial direction, and a tapered portion extending upwardly in the axial direction from an inner end of the protrusion portion; a base member coupled to the protrusion portion; and a rotating member forming a bearing clearance with the shaft and provided to be rotatable with respect to the shaft, wherein a first recess portion accommodating the first insertion portion is provided in an upper portion of the rotating member and a second recess portion accommodating the tapered portion is provided in a lower portion of the rotating member, and an upper labyrinth sealing portion is provided between an outer edge of the flange portion and the rotating member.

A first fluid-vapor interface may be formed between an outer circumferential surface of the first insertion portion and an inner wall of the rotating member, and a second liquid-vapor interface may be formed between an outer circumferential surface of the tapered portion and an inner wall of the rotating member forming the second recess portion.

A micro-clearance may be formed between the tapered portion and the second recess portion.

At least one of an inner circumferential surface, an upper surface, and an outer circumferential surface of the tapered protrusion portion may be tapered.

A lower labyrinth sealing portion may be formed between the protrusion portion and the rotating member.

According to another aspect of the present invention, there is provided a hard disk drive including: a spindle motor rotating a disk by power applied through a board; a magnetic head writing data to or reading data from the disk; and a head driving unit transferring the magnetic head to a certain position above the disk.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
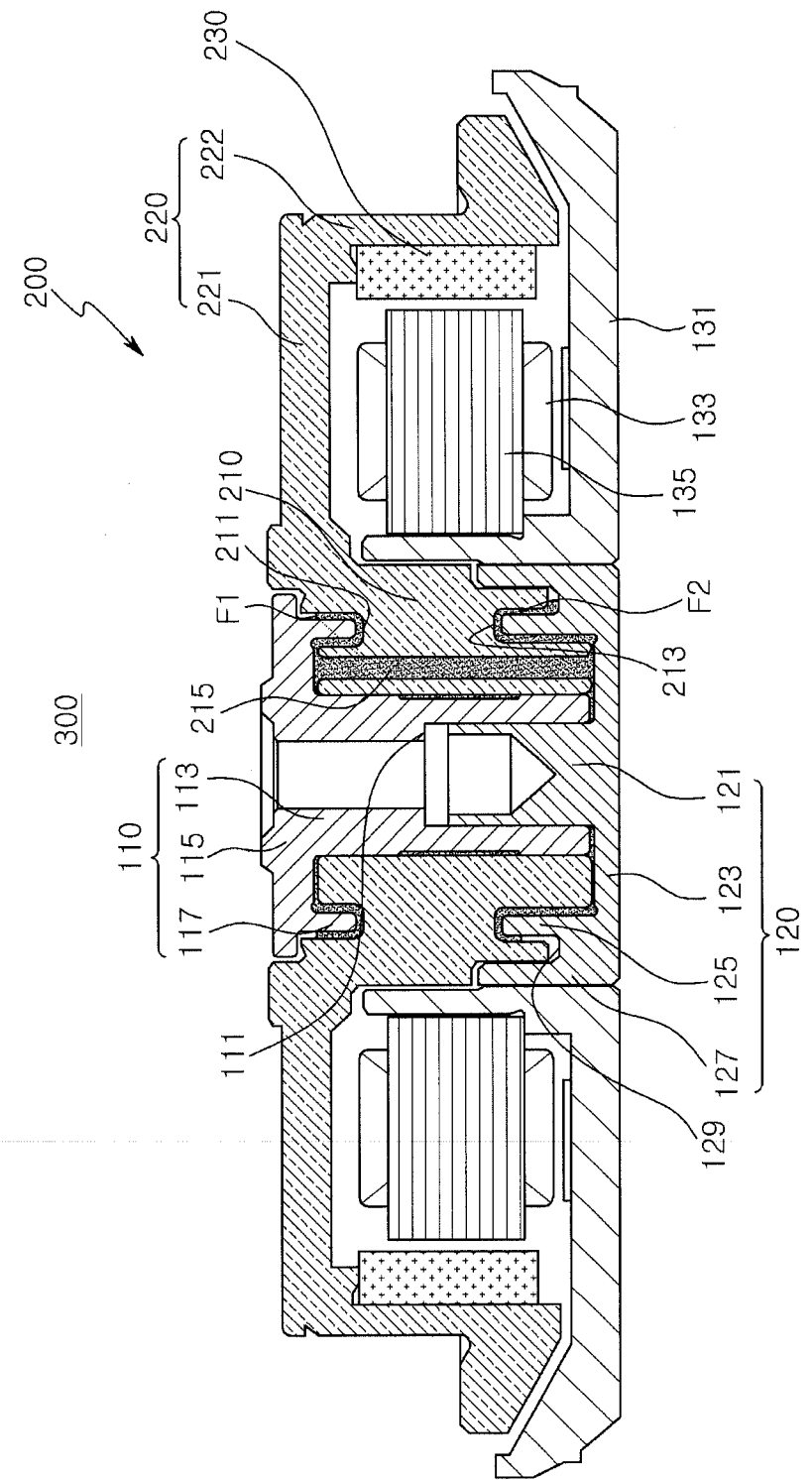
FIG. 1 is a schematic cross-sectional view of a spindle motor according to a first embodiment of the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

First, referring to definitions of terms of directions, an axial direction may refer to a vertical direction based on a shaft 110, and an outer or inner radial direction may refer to an outer edge direction of the a rotor hub 220 based on the shaft 110 and a central direction of the shaft 110 based on an outer edge of the rotor hub 220, respectively.

FIG. 1 is a schematic cross-sectional view of a spindle motor according to a first embodiment of the present invention.

Referring to FIG. 1, a spindle motor according to a first embodiment of the present invention may include a fixed member including the shaft 110, a lower thrust member 120, and a base member 131, and a rotating member 200.

The shaft 110 and the lower thrust member 120 may constitute a fixed member together with the base member 131.

The shaft 110 may be installed to be indirectly fixed to the base member 131 by the medium of the lower thrust member 120, and may constitute a fixed member together with the lower thrust member 120 and the base member 131.

The shaft 110 may include a body portion 113 inserted into a shaft hole of the rotating member 200, a flange portion 115 extending in the outer radial direction from an upper portion of the body portion 113, and a first insertion portion 117 extending downwardly from the flange portion 115 in an axial direction.

A fixing recess 111 may be provided in a lower portion of the body portion 113, and a portion of the lower thrust member 120 is inserted into the fixing recess 111.

Namely, the fixing recess 111 may be provided in a lower portion of the body portion 110 such that the fixing recess 111 is sunken upwardly in the axial direction, and a portion of the lower thrust member 120 may be insertedly fixed in the fixing recess 111 through at least one of press-fitting, welding, and bonding.

The flange portion 115 may extend to an outer edge from an upper portion of the body portion 113, and a lower surface of the flange portion 115 may face an upper surface of the rotating member 200.

A thrust dynamic pressure generating portion (not shown) may be formed on a lower surface of the flange portion 115 to generate thrust dynamic pressure to allow the rotating member 200 to rotate more stably.

However, the present invention is not limited thereto and the thrust dynamic pressure generating portion (not shown) may also be formed on a surface of the rotating member 200 facing a lower surface of the flange portion 115.

Meanwhile, the first insertion portion 117 may extend to protrude from a lower surface of the flange portion 115 downwardly in the axial direction, and a liquid-vapor interface F1 may be formed between the first insertion 117 and the first recess portion 211 formed in the rotating member 200.

This will be described in detail with reference to FIG. 2.

The lower thrust member 120 may form a second liquid-vapor interface F2 together with the sleeve 210 of the rotating member 200, and may be combined to the shaft 110 to constitute a fixed member.

The lower thrust member 120 may include a fixed portion 121 inserted into the fixing recess 111, a disk portion 123 extending from the fixed portion 121 in an outer radial direction, and first and second protrusion portions 125 and 127 extending from the disk portion 123 in the axial direction.

A thrust dynamic pressure generating portion (not shown) may be formed on at least one of an upper surface of the disk portion 123 provided in the lower thrust member 120 and a surface of the disk portion 123 facing the rotating member 200 in order to generate thrust dynamic pressure.

Namely, since thrust dynamic pressure is generated by the thrust dynamic pressure generating portion (not shown) formed in the lower thrust member 120 when the rotating member 200 rotates, the rotating member 200 may rotate more stably.

Meanwhile, the first protrusion portion 125 may extend upwardly from the disk portion 123 in the axial direction, and the second liquid-vapor interface F2 may be formed between the first protrusion portion 125 and the second recess portion 213 formed in the rotating member 200.

This will be described in detail with reference to FIG. 2.

Like the first protrusion portion 125, the second protrusion portion 127 may also extend from the disk portion 123 upwardly in the axial direction, and may be formed in an outer side in the radial direction, relative to the first protrusion portion 125.

Thus, an accommodation recess 129 may be formed to be depressed downwardly in the axial direction between the first protrusion portion 125 and the second protrusion portion 127, and a portion of the rotating member 200 may be disposed in the accommodation recess 129.

Also, an outer circumferential surface of the second protrusion portion 127 may be coupled to the base member 131 through at least one of welding, bonding, and press-fitting.

The base member 131 may be a fixed member supporting rotation of the rotating member 200.

Namely, the base member 131 may be coupled to the lower thrust member 120 to fix the lower thrust member 120, and the shaft 110 may be installed to be indirectly fixed to the base member 131 by the medium of the lower thrust member 120.

Also, the base member 131 may form a predetermined space together with the rotating member 200, and a core 135 around which a coil 133 is wound may be disposed in the space.

Namely, the core 135 around which the coil 133 is wound may be fixedly installed in the base member 131.

The base member 131 may be made of aluminum (Al) and fabricated according to a die-casting method. The base member 131 may be fabricated by performing plastic working (e.g., press working) on a steel sheet.

The rotating member 200 may be rotatably installed, while maintaining a bearing clearance with the shaft 110 as described above by the medium of a lubricating fluid, and a recording medium may be mounted thereon.

The rotating member 200 may include the sleeve 210 forming a bearing clearance with the fixed member and the rotor hub 220 extending from the sleeve 210.

The sleeve 210 and the rotor hub 220 may be configured as separate members and coupled to constitute the rotating member 200. However, in the spindle motor 300 according to the first embodiment of the present invention, the sleeve 210 and the rotor hub 220 are integrally formed to constitute the rotating member 200.

In the case in which the sleeve 210 and the rotor hub 220 are integrally formed to constitute the rotating member 210, repeatable run out (RRO) may be reduced to minimize microvibrations, maximizing performance of the spindle motor 300.

At least one bypass flow channel 215 connecting upper and lower portions of the sleeve 210 (i.e., allowing the upper and lower portions of the sleeve 210 to communicate) may be formed in the sleeve 210.

The bypass flow channel 215 may have various shapes to connect the upper and lower portions of the sleeve 210.

Figure 5A:
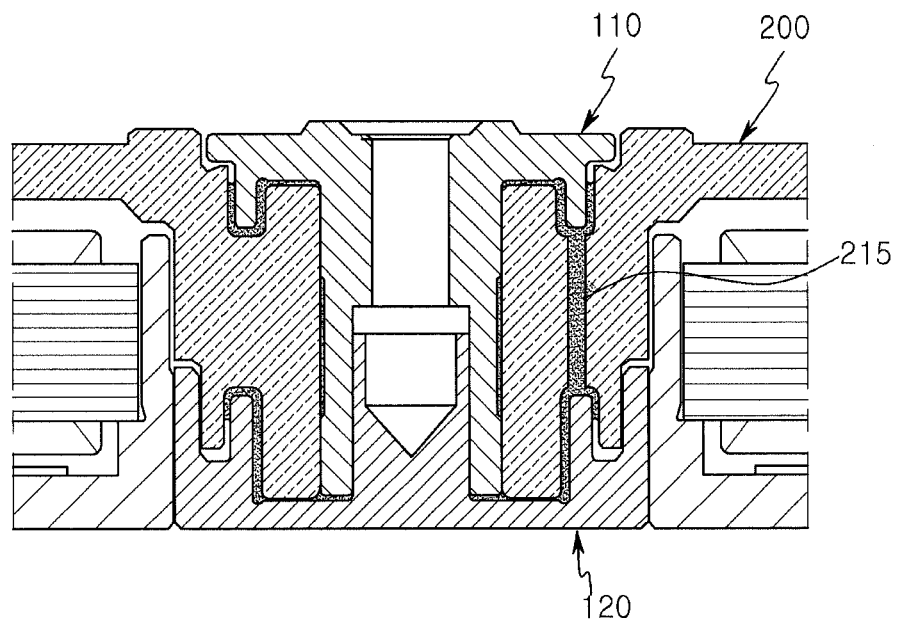
FIG. 5A is a schematic cross-sectional view illustrating a modification of a bypass flow channel of the spindle motor according to the first embodiment of the present invention.
Figure 5B:
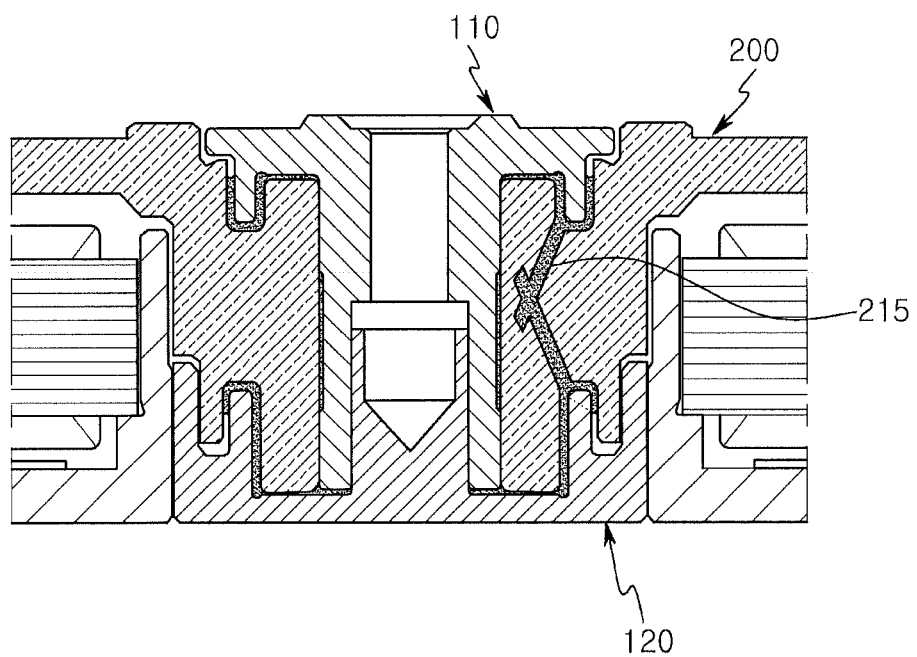
FIG. 5B is a schematic cross-sectional view illustrating a modification of a bypass flow channel of the spindle motor according to the first embodiment of the present invention.
Figure 5C:
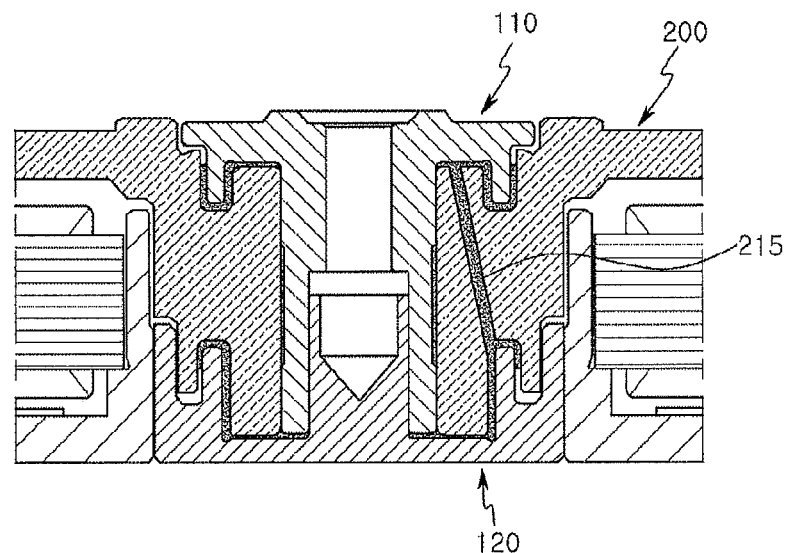
FIG. 5C is a schematic cross-sectional view illustrating a modification of a bypass flow channel of the spindle motor according to the first embodiment of the present invention.
Figure 5D:
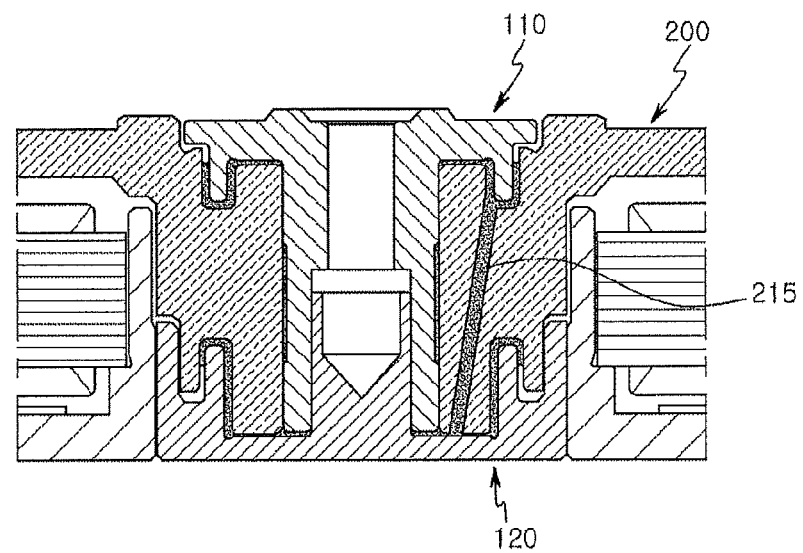
FIG. 5D is a schematic cross-sectional view illustrating a modification of a bypass flow channel of the spindle motor according to the first embodiment of the present invention.

Namely, as illustrated in FIGS. 5A and 5B, a formation position of the bypass flow channel 215 may be variously modified as long as the bypass flow channel 215 may connect the upper and lower portions of the sleeve 210.

Figure 2:
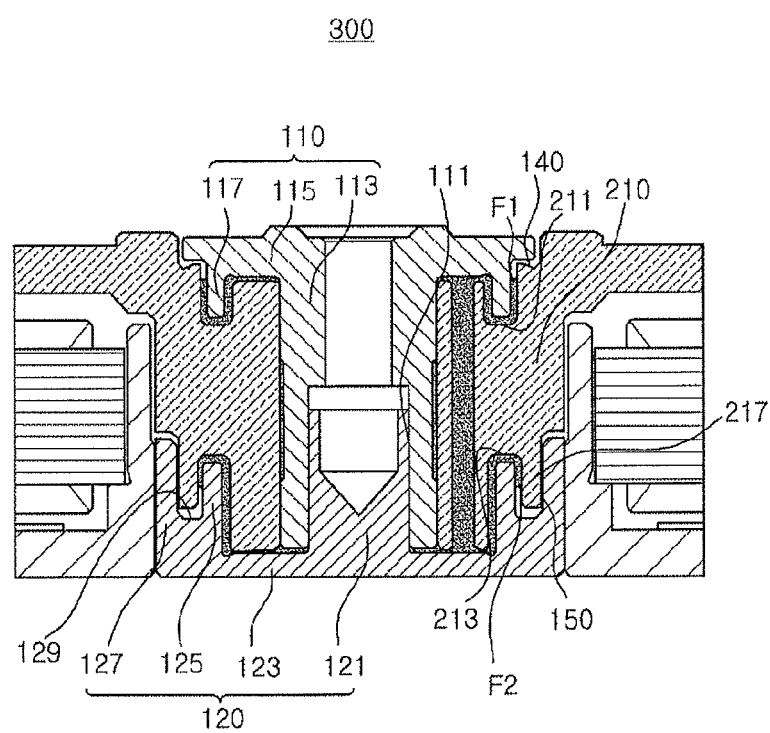
FIG. 2 is a partial cross-sectional view of the spindle motor according to the first embodiment of the present invention.
Figure 6A:
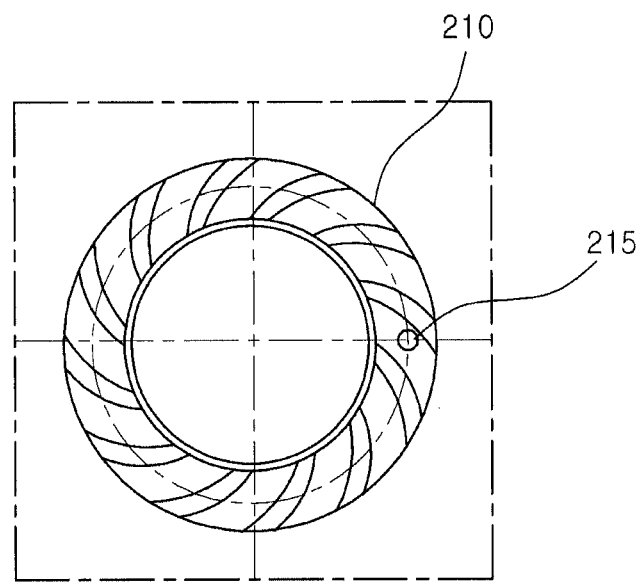
FIG. 6A is a plan view illustrating a configuration in which a bypass flow channel is formed on an upper surface of a sleeve in which a thrust dynamic pressure generating portion is formed to have a spiral shape.
Figure 6B:
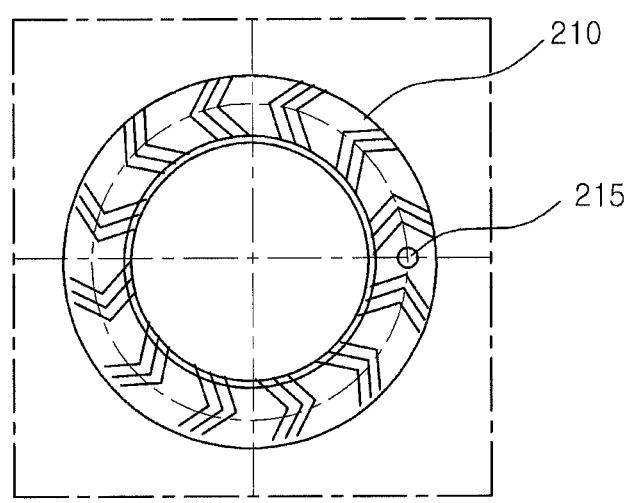
FIG. 6B is a plan view illustrating a configuration in which a bypass flow channel is formed on an upper surface of a sleeve in which a thrust dynamic pressure generating portion is formed to have a herringbone shape.
Figure 6C:
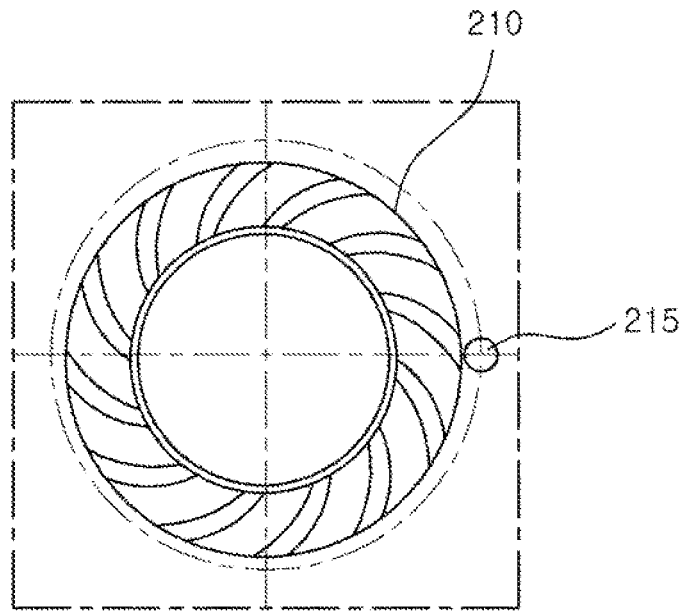
FIG. 6C is a plan view illustrating a configuration in which a bypass flow channel is formed at an outer side of an upper surface of the sleeve, in a radial direction, in which a thrust dynamic pressure generating portion is formed to have a spiral shape.

FIG. 6A and FIG. 6B are a plan view illustrating a configuration in which the bypass flow channel is formed on an upper surface of the sleeve 210 in which a thrust dynamic pressure generating portion is formed as illustrated in FIG. 2, and FIG.

Figure 6D:
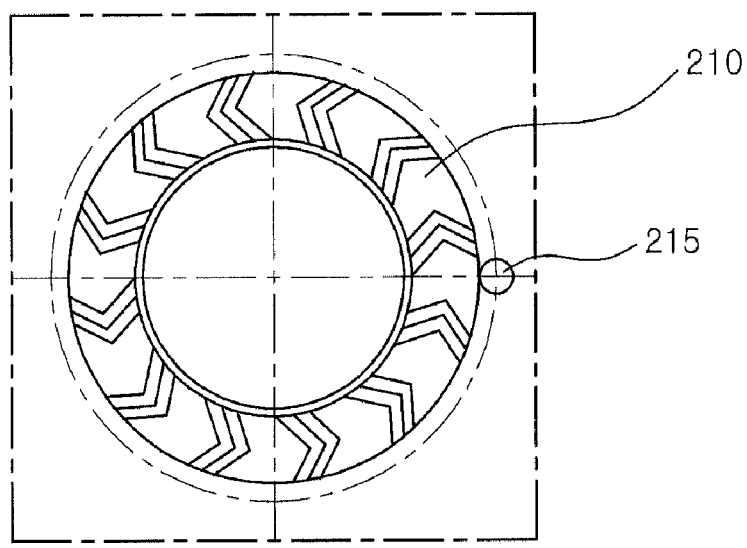
FIG. 6D is a plan view illustrating a configuration in which a bypass flow channel is formed at an outer side of an upper surface of the sleeve, in the radial direction, in which a thrust dynamic pressure generating portion is formed to have a herringbone shape.

6C and FIG. 6D are a plan view illustrating a configuration in which the bypass flow channel 215 is formed in an outer side in the radial direction, relative to the upper surface of the sleeve 210 in which a thrust dynamic pressure generating portion is formed as illustrated in FIG. 5A.

The bypass flow channel 215 may disperse pressure of a lubricating fluid to balance pressure thereof, and allow bubbles existing within the lubricating fluid to move so as to be expelled through circulation.

The sleeve 210 may be coupled to the shaft 110 and the lower thrust member 120, while maintaining a bearing clearance with the shaft 110 and the lower thrust member 120.

Also, a radial dynamic pressure portion (not shown) may be formed on an inner circumferential surface of the sleeve 210 to generate a fluid dynamic pressure by the medium of a lubricating fluid filled in the bearing clearance when the sleeve 210 is rotated.

However, the radial dynamic pressure portion (not shown) is not limited to being formed on the inner circumferential surface of the sleeve 210; the radial dynamic pressure portion (not shown) may also be formed on an outer circumferential surface of the shaft 110.

The sleeve 210 may have a through hole formed in the center thereof. The body portion 113 of the shaft 110 may be inserted into the through hole of the sleeve 210. The sleeve 210 may have a first recess portion 211 formed in an upper portion thereof to accommodate the first insertion portion 117 therein and a second recess portion 213 formed in a lower portion thereof to accommodate the first protrusion portion 125 therein.

The sleeve 210 provided in the rotating member 200 may form a bearing clearance with the shaft 110.

Here, the bearing clearance will be described in detail. The inner circumferential surface of the sleeve 210 is spaced apart from the outer circumferential surface of the body portion 113 by a predetermined interval to form a bearing clearance, and the upper surface of the sleeve 210 and the flange portion 115, and the lower surface of the sleeve 210 and the lower thrust member 120 may also be spaced apart by a predetermined interval to form a bearing clearance.

The bearing clearance may be connected to one another and a lubricating fluid may be provided in the bearing clearance.

The rotor hub 220 may include a hub base 221 extending from the sleeve 210 in the outer radial direction and a magnet support portion 222 extending from the hub base 221 in the axial direction.

An annular magnet 230 may be installed on an inner circumferential surface of the magnet support portion 222. The magnet 230 may be a permanent magnet having an N pole and an S pole alternately magnetized in the circumferential direction to generate a magnetic field having predetermined strength.

Also, the magnet 230 may be disposed to face the core 133 around which the coil 135 is wound. The magnet 230 generates driving force (or power) enabling the rotating member 200 to rotate according to an electromagnetic interaction with the core 133 with the coil 135 wound therearound.

Namely, when power is supplied to the coil 135, driving force enabling the rotating member 200 to rotate according to an electromagnetic interaction between the core 133 with the coil 135 wound therearound and the magnet 230 is generated, so the rotating member 200 may rotate about the shaft 100 (by being centered thereon).

Figure 3:
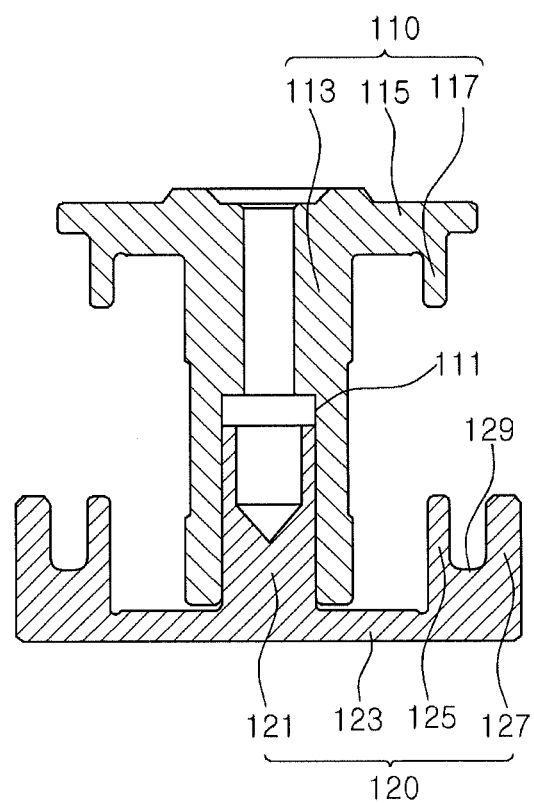
FIG. 3 is a cross-sectional view showing a configuration in which a shaft and a lower thrust member of the spindle motor are coupled according to the first embodiment of the present invention.

FIG. 2 is a partial cross-sectional view of the spindle motor according to the first embodiment of the present invention. FIG. 3 is a cross-sectional view showing a configuration in which the shaft and the lower thrust member of the spindle motor are coupled according to the first embodiment of the present invention.

Figure 4A:
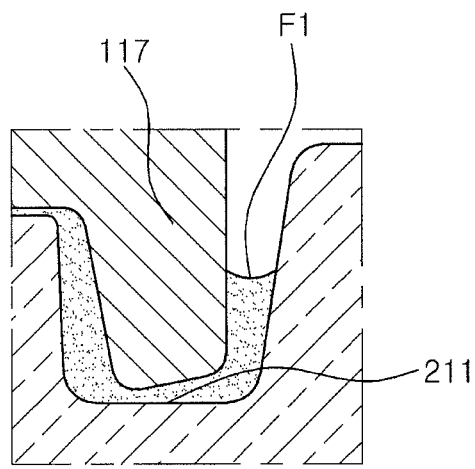
FIG. 4A is a schematic cross-sectional view illustrating a first fluid-vapor interface of the spindle motor according to the first embodiment of the present invention.
Figure 4B:
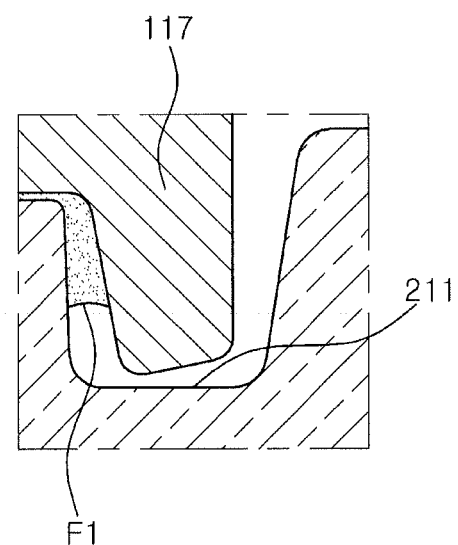
FIG. 4B is a schematic cross-sectional view illustrating a state in which the first fluid-vapor of the spindle motor has moved according to the first embodiment of the present invention.

FIG. 4A is a schematic cross-sectional view illustrating the first fluid-vapor interface of the spindle motor according to the first embodiment of the present invention. FIG. 4B is a schematic cross-sectional view illustrating a state in which the first fluid-vapor of the spindle motor has moved according to the first embodiment of the present invention.

The first fluid-vapor interface F1, the second fluid-vapor interface F2, and upper and lower labyrinth sealing portions 140 and 150 will be described with reference to FIGS. 2 through 4B.

The first recess portion 211 may be formed to be sunken downwardly in the axial direction on an upper portion of the sleeve 210 provided in the rotating member 200, and the first insertion portion 117 provided in the shaft 110 may be accommodated in the first recess portion 211.

The first insertion portion 117 accommodated in the first recess portion 211 may form a micro-clearance (or a microclearance) with an inner wall forming the first recess portion 211, and the micro-clearance may be continuously filled with a lubricating fluid.

In order to seal the lubricating fluid, at least one of an inner circumferential surface, a lower surface, and an outer circumferential surface of the first insertion portion 117 may be tapered, and the first fluid-vapor interface F1 may be formed between the outer circumferential surface of the first insertion portion 117 and the inner wall forming the first recess portion 211.

Namely, as illustrated in FIG. 4A, a U-shaped micro-clearance is formed by the first insertion portion 117 and the first recess portion 211 and filled with a lubricating fluid and the lubricating fluid is sealed in the outermost portion of the micro-clearance in the radial direction, whereby a sufficient storage space for the lubricating fluid can be secured.

While the spindle motor is being driven, the lubricating fluid may be gradually reduced due to factors such as leakage, evaporation, or the like, of the lubricating fluid, failing to provide a sufficient fluid pressure to negatively affect the driving of the spindle motor.

However, in the spindle motor 300 according to the first embodiment of the present invention, since the first liquid-fluid interface F1 is formed between the outer circumferential surface of the first insertion portion 117 and the inner wall forming the first recess portion 211, a storage space of the lubricating fluid may be sufficiently secured, resulting in an increase in a lifespan of the spindle motor.

Also, as illustrated in FIG. 4B, in a case in which the first liquid-vapor interface F1 is moved in the inner radial direction according to evaporation of the lubricating fluid, although the lubricating fluid is released to be leaked due to external impact, or the like, the lubricating fluid may be sealed again by the tapered structure existing outside of the first vapor-liquid interface F1.

Thus, leakage of the lubricating fluid can be effectively prevented.

The second recess portion 213 formed to be sunken upwardly in the axial direction may be provided in a lower portion of the sleeve 210 provided in the rotating member 200.

The first recess portion 211 may be formed to be sunken downwardly in the axial direction on an upper portion of the sleeve 210 provided in the rotating member 200, and the first protrusion portion 125 provided in the lower thrust member 120 may be accommodated in the second recess portion 213.

The first protrusion portion 125 accommodated in the second recess portion 213 may form a micro-clearance with an inner wall forming the second recess portion 213, and the micro-clearance may be continuously filled with a lubricating fluid.

In order to seal the lubricating fluid, at least one of an inner circumferential surface, an upper surface, and an outer circumferential surface of the first protrusion portion 125 may be tapered, and the second fluid-vapor interface F2 may be formed between the outer circumferential surface of the first protrusion portion 125 and the inner wall forming the second recess portion 213.

Namely, as illustrated in FIG. 4A, a reversed U-shaped micro-clearance is formed by the first protrusion portion 125 and the second recess portion 213 and filled with a lubricating fluid and the lubricating fluid is sealed in the outermost portion of the micro-clearance in the radial direction, whereby a sufficient storage space of the lubricating fluid can be secured.

While the spindle motor is being driven, the lubricating fluid may be gradually reduced due to factors such as leakage, evaporation, or the like, of the lubricating fluid, failing to provide sufficient fluid pressure and negatively affecting driving of the spindle motor.

However, in the spindle motor 300 according to the first embodiment of the present invention, since the second liquid-fluid interface F2 is formed between the outer circumferential surface of the first protrusion portion 125 and the inner wall forming the second recess portion 213, a storage space of the lubricating fluid may be sufficiently secured, resulting in an increase in a lifespan of the spindle motor.

Also, in a case in which the second liquid-vapor interface F2 is moved in the inner radial direction according to evaporation of the lubricating fluid, although the lubricating fluid may be released to be leaked due to external impact, or the like, the lubricating fluid may be sealed again by the tapered structure existing outside of the second vapor-liquid interface F2.

Thus, leakage of the lubricating fluid can be effectively prevented.

The upper labyrinth sealing portion 140 may be formed between the flange portion 115 provided in the shaft 110 and the rotating member 200.

In detail, a micro-clearance is formed between an outer edge of the flange portion 115 and a surface of the rotating member 200 facing the outer edge to form the upper labyrinth sealing portion 140.

By varying the size of the micro-clearance constituting the upper labyrinth sealing portion 140, a pressure reduction and energy loss are caused to prevent a foreign object from being introduced into the bearing clearance, the lubricating fluid from being released from the first liquid-vapor interface F1 so as to be leaked to the outside, and a foreign object from being introduced.

The lower labyrinth sealing portion 150 may be formed between the lower thrust member 120 and the rotating member 200.

The second protrusion 127 may be formed on an outer side in the radial direction, relative to the first protrusion 125, forming the accommodation recess 129 sunken downwardly in the axial direction between the first protrusion 125 and the second protrusion 127.

A projection portion 217 projected downwardly in the axial direction from a lower portion of the rotating member 200 may be accommodated in the accommodation recess 129, and a micro-clearance may be formed between the accommodation recess 129 and the projection portion 217 to constitute the lower labyrinth sealing portion 150.

By varying the size of the micro-clearance constituting the lower labyrinth sealing portion 150, pressure reduction and energy loss may be caused, preventing a foreign object from being introduced into the bearing clearance, the lubricating fluid from being released from the second liquid-vapor interface F2 so as to be leaked to the outside, and a foreign object from being introduced.

Figure 7:
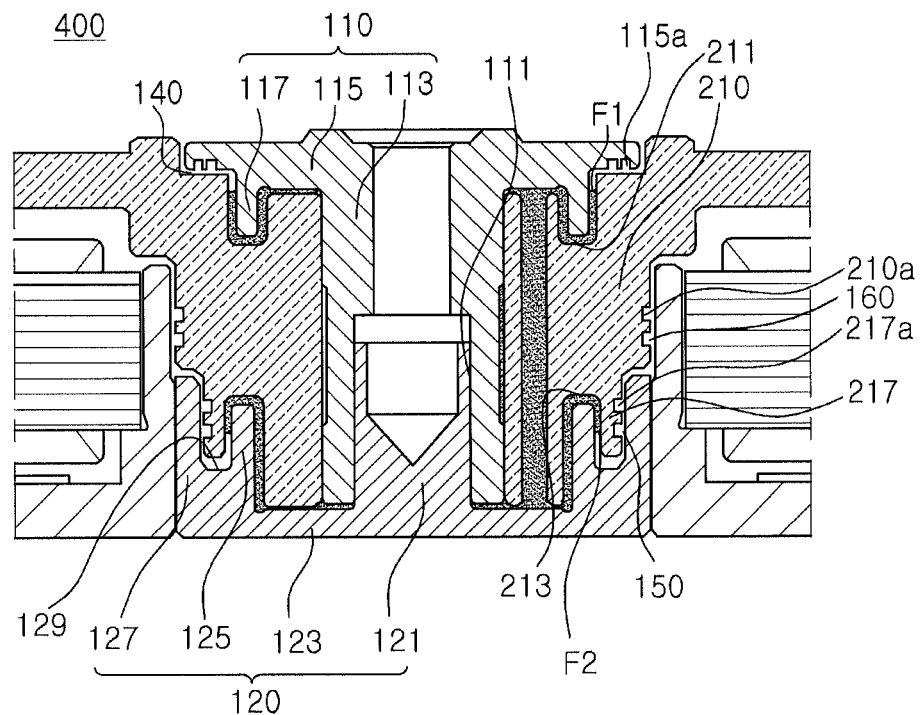
FIG. 7 is a schematic cross-sectional view of a spindle motor according to a second embodiment of the present invention.

FIG. 7 is a schematic cross-sectional view of a spindle motor according to a second embodiment of the present invention.

Referring to FIG. 7, a spindle motor 400 according to the second embodiment of the present invention may have the same configuration as that of the spindle motor 300 according to the first embodiment of the present invention, except for the labyrinth sealing portions 140, 150, and 160, so description of components other than the labyrinth sealing portions 140, 150, and 160 will be omitted.

The upper labyrinth sealing portion 140 may be formed between the flange portion 115 provided in the shaft 110 and the rotating member 200.

In detail, a micro-clearance may be formed between an outer edge of the flange portion 115 and a surface of the rotating member 200 facing the outer edge of the flange portion 115 to form the upper labyrinth sealing portion 140.

Here, a recess 115a may be formed on at least one of a lower surface and a lateral surface of the outer edge of the flange portion 115.

Thus, a size of the gap between the outer edge of the flange portion 115 and the surface of the rotating member 200 facing the outer edge of the flange portion 115 may be varied to thus cause a pressure reduction and energy loss to prevent a foreign object from being introduced into the bearing clearance, the lubricating fluid from being released from the first liquid-vapor interface F1 so as to be leaked to the outside, and a foreign object from being introduced.

The lower labyrinth sealing portion 150 may be formed between the lower thrust member 120 and the rotating member 200.

The second protrusion 127 may be formed at an outer side in the radial direction, relative to the first protrusion 125, forming the accommodation recess 129 sunken downwardly in the axial direction between the first protrusion 125 and the second protrusion 127.

The projection portion 217 projected downwardly in the axial direction from a lower portion of the rotating member 200 may be accommodated in the accommodation recess 129, and a micro-clearance may be formed between the accommodation recess 129 and the projection portion 217 to constitute the lower labyrinth sealing portion 150.

Here, a recess 217a may be formed on at least one of an outer circumferential surface and a lower surface of the projection portion 217.

Thus, the size of the gap between the lower surface or the outer circumferential surface of the projection portion 217 and the surface of the rotating member 200 facing the lower surface or the outer circumferential surface of the projection portion 217 may be varied to thus cause a pressure reduction and energy loss to prevent a foreign object from being introduced into the bearing clearance, the lubricating fluid from being released from the second liquid-vapor interface F2 so as to be leaked to the outside, and a foreign object from being introduced.

An outer labyrinth sealing portion 160 may be formed between an outer circumferential surface of the sleeve 210 provided in the rotating member 200 and the base member 131.

A portion of the outer circumferential surface of the sleeve 210 may face an inner circumferential surface of the base member 131, and a micro-clearance may be formed between the outer circumferential surface of the sleeve 210 and the inner circumferential surface of the base member 131 to constitute the outer labyrinth sealing portion 160.

Here, a recess 210a may be formed in the outer circumferential surface of the sleeve 210 to vary the size of the gap between the outer circumferential surface of the sleeve 210 and the inner circumferential surface of the base member 131.

Since the outer labyrinth sealing portion 160 may be formed outside the lower labyrinth sealing portion 150, of the lubricating fluid is more effectively prevented from being released from the second fluid-vapor interface F2 so as to be leaked to the outside and an introduction of a foreign object is also prevented.

Figure 8:
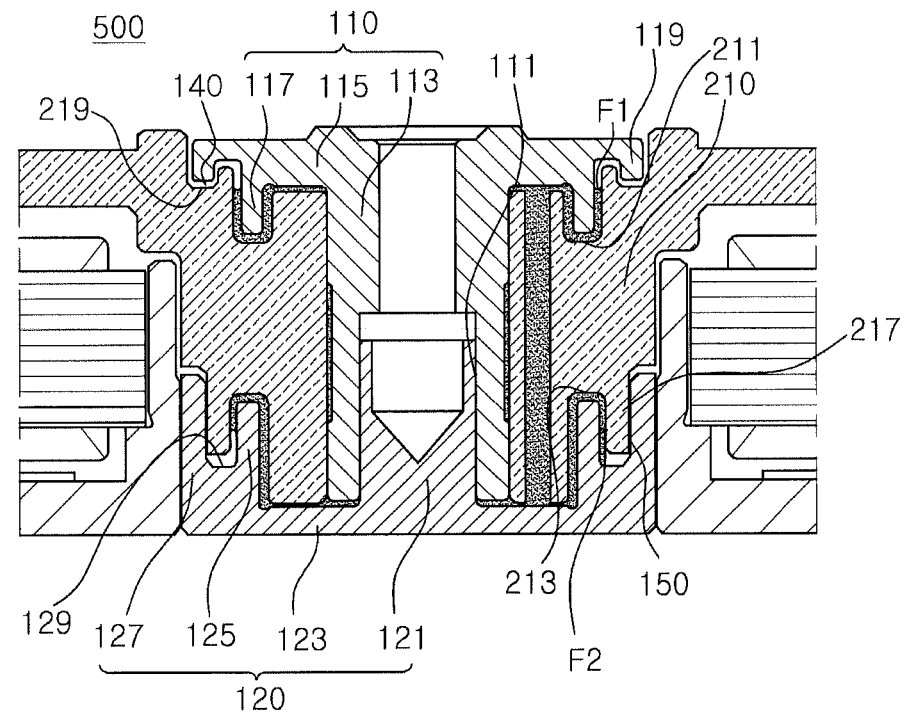
FIG. 8 is a schematic cross-sectional view of a spindle motor according to a third embodiment of the present invention.
Figure 9:
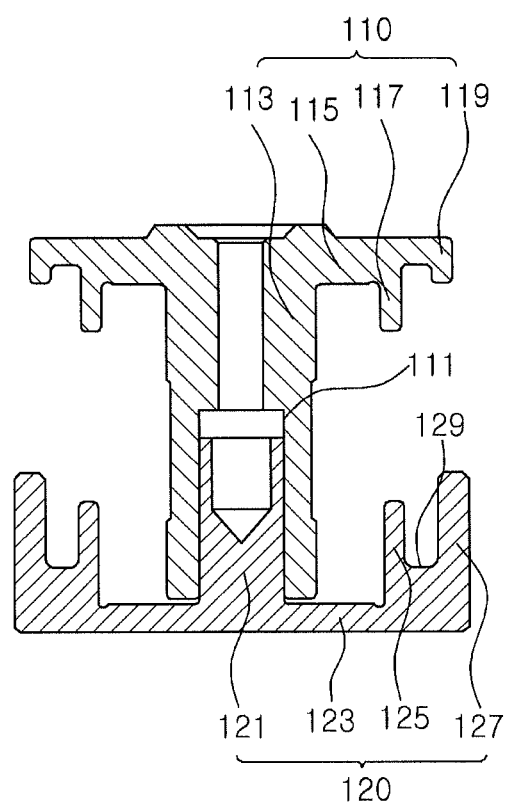
FIG. 9 is a cross-sectional view showing a configuration in which a shaft and a lower thrust member of the spindle motor are coupled according to the third embodiment of the present invention.

FIG. 8 is a schematic cross-sectional view of a spindle motor according to a third embodiment of the present invention, and FIG. 9 is a cross-sectional view showing a configuration in which a shaft and a lower thrust member of the spindle motor are coupled according to the third embodiment of the present invention.

Referring to FIGS. 8 and 9, a spindle motor 500 according to the third embodiment of the present invention has the same configuration as that of the spindle motor 300 according to the first embodiment of the present invention, except for the shaft 110 and the rotating member 200, so a description of components other than the shaft 110 and the rotating member 200 will be omitted.

The shaft 110 may be installed to be indirectly fixed to the base member 131 by the medium of the lower thrust member 120, and may constitute a fixed member together with the lower thrust member 120 and the base member 131.

The shaft 110 may include the body portion 113 in a shaft hole of the rotating member 200, the flange portion 115 extending from an upper portion of the body portion 113 in the outer radial direction, the first insertion portion 117 extending from the flange portion 115 downwardly in the axial direction, and a second insertion portion 119 extending downwardly from an outer edge of the flange portion 115 in the axial direction.

Namely, the second insertion portion 119 may be formed at an outer side in the radial direction, relative to the first insertion portion 117.

The rotating member 200 may include a third recess portion 219 formed to accommodate the second insertion portion 119.

A micro-clearance may be formed between the second insertion portion 119 and the third recess portion 219 to constitute the upper labyrinth sealing portion 140.

Figure 10:
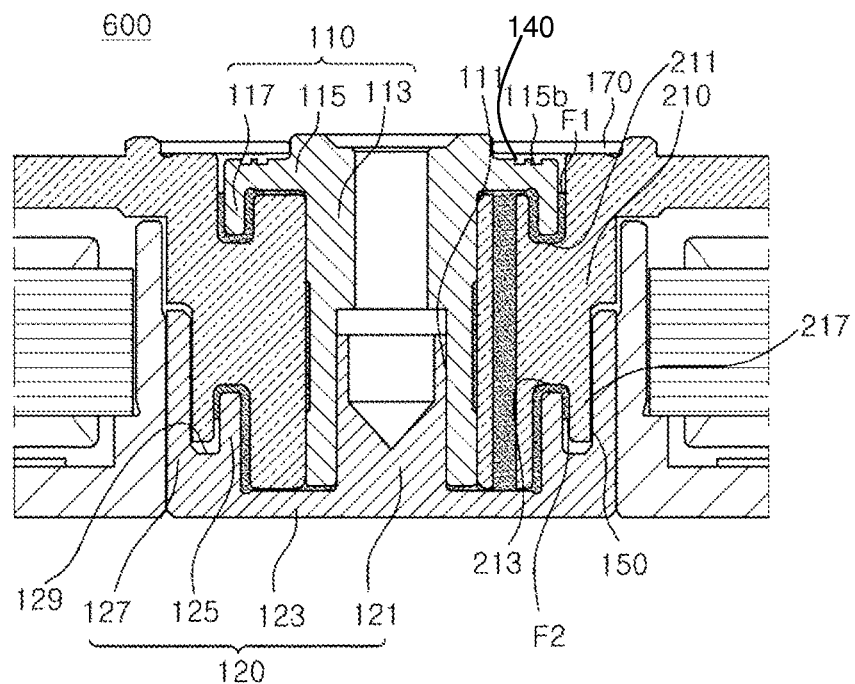
FIG. 10 is a schematic cross-sectional view of a spindle motor according to a fourth embodiment of the present invention.

FIG. 10 is a schematic cross-sectional view of a spindle motor according to a fourth embodiment of the present invention.

Referring to FIG. 10, a spindle motor 600 according to the fourth embodiment of the present invention has the same configuration as that of the spindle motor 300 according to the first embodiment of the present invention, except for the shaft 110 and a cover member 170, so a description of components other than the shaft 110 and the cover member 170 will be omitted.

An upper surface of the rotating member 200 may have a step in order to fix the cover member 170 therein.

The cover member 170 may be fixedly disposed in the step portion of the upper surface of the rotating member 200, restraining leakage and evaporation of a lubricating fluid.

An upper surface of the flange portion 115 may face a lower surface of the cover member 170 and a micro-clearance may be formed between the upper surface of the flange portion 115 and the cover member 170 to constitute the upper labyrinth sealing portion 140.

Here, a recess 115b may be formed in at least one of an upper surface of the flange portion 115 and a lower surface of the cover member 170.

Thus, a size of the gap between the upper surface of the flange portion 115 and the lower surface of the cover member 170 may be varied to thus cause a pressure reduction and energy loss to prevent a foreign object from being introduced into the bearing clearance, the lubricating fluid from being released from the first liquid-vapor interface F1 so as to be leaked to the outside, and a foreign object from being introduced.

Figure 11:
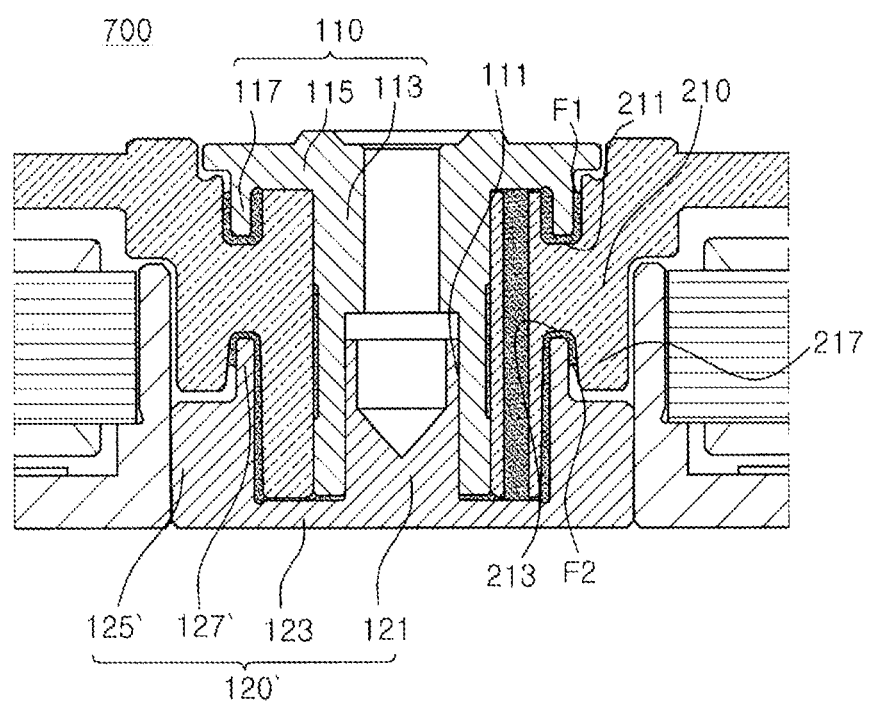
FIG. 11 is a schematic cross-sectional view of a spindle motor according to a fifth embodiment of the present invention.
Figure 12:
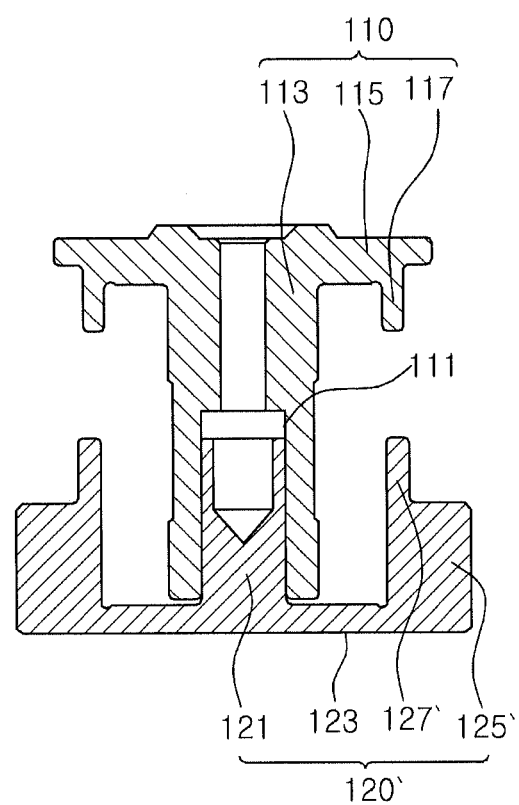
FIG. 12 is a cross-sectional view showing a configuration in which a shaft and a lower thrust member of the spindle motor are coupled according to the fifth embodiment of the present invention.
Figure 13:
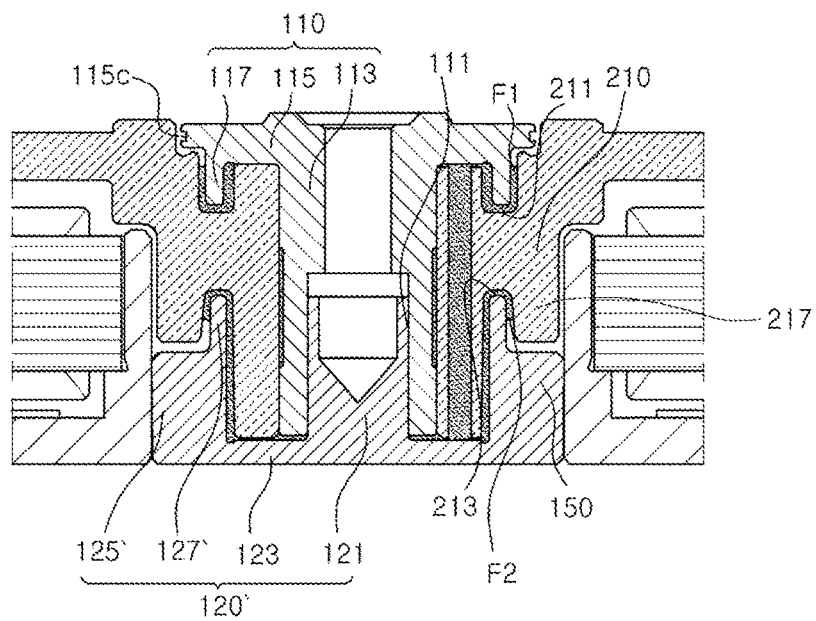
FIG. 13 is a schematic cross-sectional view illustrating a configuration in which a recess is formed in an outer end of a flange portion of a shaft according to the fifth embodiment of the present invention.

FIG. 11 is a schematic cross-sectional view of a spindle motor according to a fifth embodiment of the present invention. FIG. 12 is a cross-sectional view showing a configuration in which a shaft and a lower thrust member of the spindle motor are coupled according to the fifth embodiment of the present invention. FIG. 13 is a schematic cross-sectional view illustrating a configuration in which a recess is formed in an outer end of a flange portion of a shaft according to the fifth embodiment of the present invention.

Referring to FIGS. 11 through 13, a spindle motor 600 according to the fifth embodiment of the present invention has the same configuration as that of the spindle motor 300 according to the first embodiment of the present invention, except for a lower thrust member 120', so a description of components other than the lower thrust member 120' will be omitted.

The lower thrust member 120' may form the second liquid-vapor interface F2 together with the sleeve 210 of the rotating member 200 and may be coupled to the shaft 110 to constitute a fixed member.

The lower thrust member 120' may include a fixed portion 121 inserted into the fixing recess 111, the disk portion 123 extending from the fixed portion 121 in an outer radial direction, a protrusion portion 125' extending from the disk portion in the axial direction 123, and a tapered portion 127' extending upwardly in the axial direction from an inner end of the protrusion portion 125'.

A thrust dynamic pressure generating portion (not shown) may be formed on at least one of an upper surface of the disk portion 123 provided in the lower thrust member 120' and a surface of the disk portion 123 facing the rotating member 200 in order to generate thrust dynamic pressure.

Namely, since thrust dynamic pressure is generated by the thrust dynamic pressure generating portion (not shown) formed in the lower thrust member 120' when the rotating member 200 rotates, the rotating member 200 may rotate more stably.

Meanwhile, the protrusion portion 125' may extend upwardly from the disk portion 123 in the axial direction, and an outer circumferential surface of the protrusion portion 125' may be coupled to the base member 131 through at least one of welding, bonding, and press-fitting.

The tapered portion 127' may extend upwardly in the axial direction from an inner end of the protrusion portion 125', and the second liquid-vapor interface F2 may be formed between the tapered portion 127' and the second recess portion 129 formed in the rotating member 200.

Also, in order to seal a lubricating fluid, at least one of an inner circumferential surface, an upper surface, and an outer circumferential surface of the tapered portion 127' may be tapered.

Meanwhile, a recess 115c may be formed on a lateral surface of the flange portion 115 provided in the shaft 110.

Figure 14:
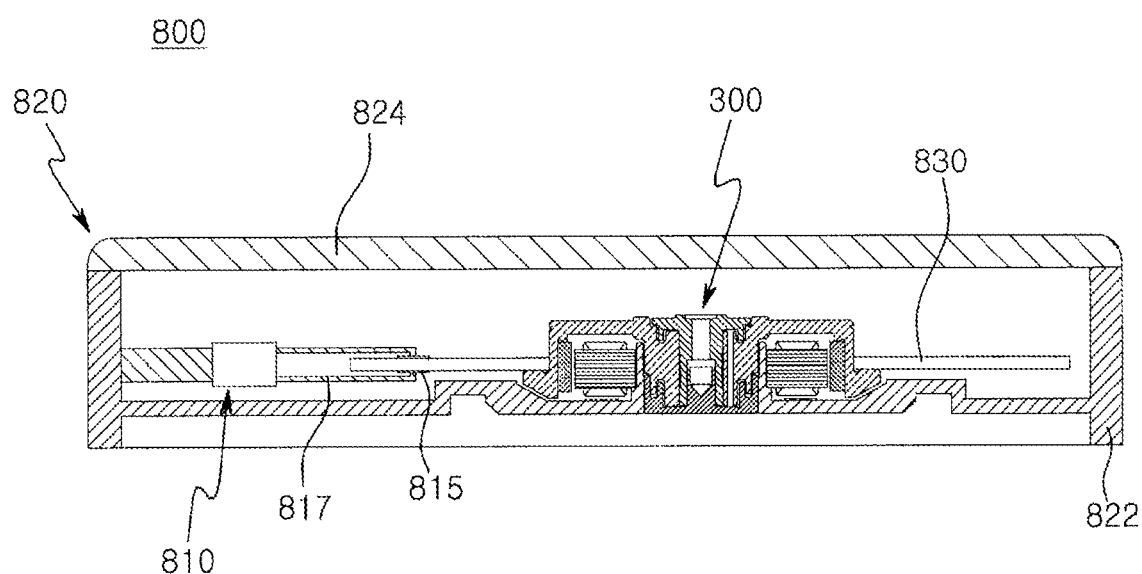
FIG. 14 is a schematic cross-sectional view of a disk drive using a spindle motor according to an embodiment of the present invention.

FIG. 14 is a schematic cross-sectional view of a disk drive using a spindle motor according to an embodiment of the present invention.

Referring to FIG. 14, a recording disk drive including a spindle motor according to an embodiment of the present invention installed therein may be a hard disk drive and include the spindle motor 300, a head driving unit 810, and a housing 820.

The spindle motor 300 may have all the characteristics of the spindle motor 300 according to an embodiment of the present invention as described above, and may include a recording disk 830 mounted thereon.

The head driving unit 810 may transfer a magnetic head 815 detecting information of the recording disk 830 mounted on the spindle motor 300 to a surface of the recording disk 830 desired to be detected.

Here, the magnetic head 815 may be disposed on a support portion 817 of the head driving unit 810.

In order to form an internal space for accommodating the spindle motor 300 and the head driving unit 810, the housing 820 may include a motor mounting plate 822 and a top cover 824 shielding an upper portion of the motor mounting plate 822.

The spindle motor 600 may have all the characteristics of the spindle motor 300 according to an embodiment of the present invention as described above, and may include a recording disk 830 mounted thereon.

The head driving unit 810 may transfer a magnetic head 815 detecting information of the recording disk 830 mounted on the spindle motor 300 to a surface of the recording disk 830 desired to be detected.

Here, the magnetic head 815 may be disposed on a support portion 817 of the head driving unit 810.

In order to form an internal space for accommodating the spindle motor 600 and the head driving unit 810, the housing 820 may include a motor mounting plate 822 and a top cover 824 shielding an upper portion of the motor mounting plate 822.

Through the embodiments described above, in the spindle motor and the hard disk drive including the same according to the present invention, a labyrinth sealing effect is maximized to prevent an introduction of a foreign object and leakage of a lubricating fluid and improve performance and a lifespan of the spindle motor.

As set forth above, according to embodiments of the invention, the spindle motor and a hard disk drive including the same may have maximized labyrinth sealing effect, preventing an introduction of a foreign object and leakage of a lubricating fluid.

Also, since a storage space for a lubricating fluid is sufficiently secured, performance and lifespan of a motor can be enhanced.

In addition, since an amount of the internal components of the spindle motor is reduced, the manufacturing process can be simplified and manufacturing costs can be reduced.

While the present invention has been shown and described in connection with the embodiments, it will be apparent to those skilled in the art that modifications and variations can be made without departing from the spirit and scope of the invention as defined by the appended claims.

What is claimed is:

1. A spindle motor comprising:
   a shaft including a body portion having a fixing recess formed on a lower portion thereof, a flange portion extending in an outer radial direction from an upper portion of the body portion, and a first insertion portion extending downwardly from the flange portion in an axial direction;
   a lower thrust member including a fixed portion inserted into the fixing recess, a disk portion extending from the fixed portion in an outer radial direction, and first and second protrusion portions extending from the disk portion in the axial direction;
   a base member coupled to the second protrusion portion; and
   a rotating member forming a bearing clearance with the shaft and provided to be rotatable with respect to the shaft,
   wherein a first recess portion accommodating the first insertion portion is provided in an upper portion of the rotating member and a second recess portion accommodating the first protrusion portion is provided in a lower portion of the rotating member, and
   an upper labyrinth sealing portion is provided between an outer edge of the flange portion and the rotating member.

2. The spindle motor of claim 1, wherein a first fluid-vapor interface is formed between an outer circumferential surface of the first insertion portion and an inner wall of the rotating member, and a second liquid-vapor interface is formed between an outer circumferential surface of the first protrusion portion and an inner wall of the rotating member forming the second recess portion.

3. The spindle motor of claim 1, wherein at least one of an inner circumferential surface, a lower surface, and an outer circumferential surface of the first insertion portion is tapered.

4. The spindle motor of claim 1, wherein at least one of an inner circumferential surface, an upper surface, and an outer circumferential surface of the first protrusion portion is tapered.

5. The spindle motor of claim 1, wherein a micro-clearance is formed between an outer edge of the flange portion and a surface of the rotating member facing the outer edge of the flange portion.

6. The spindle motor of claim 1, wherein a recess is formed on at least one of a lower surface and a lateral surface of the outer edge of the flange portion.

7. The spindle motor of claim 1, wherein the second protrusion portion is formed at an outer side in a radial direction, relative to the first protrusion portion.

8. The spindle motor of claim 7, wherein an accommodation recess is provided between the first protrusion portion and the second protrusion portion, and a projection portion protruded from a lower portion of the rotating member is accommodated in the accommodation recess.

9. The spindle motor of claim 8, wherein a micro-clearance is formed between the projection portion and the accommodation recess.

10. The spindle motor of claim 8, wherein a lower labyrinth sealing portion is formed between the projection portion and the accommodation recess.

11. The spindle motor of claim 1, wherein an outer labyrinth sealing portion is provided between an outer circumferential surface of the rotating member and a surface of the base member facing the outer circumferential surface of the rotating member.

12. The spindle motor of claim 1, wherein the flange portion further includes a second insertion portion extending downwardly in the axial direction from the outer edge thereof, and the rotating member further includes a third recess portion accommodating the second insertion portion.

13. The spindle motor of claim 12, wherein a micro-clearance is formed between the second insertion portion and the third recess portion.

14. The spindle motor of claim 12, wherein the second insertion portion is formed at an outer side in the radial direction, relative to the first insertion portion.

15. The spindle motor of claim 1, further comprising a cover member fixed to an upper surface of the rotating member and preventing leakage of a lubricating fluid.

16. The spindle motor of claim 15, wherein a recess is formed on at least one of an upper surface of the flange portion and a lower surface of the cover member.

17. The spindle motor of claim 1, wherein at least one bypass flow channel penetrating upper and lower portions of the rotating member is formed in the rotating member.

18. A hard disk drive comprising:
- the spindle motor, according to claim 1, rotating a disk by power applied through a board;
- a magnetic head writing data to or reading data from the disk; and
- a head driving unit transferring the magnetic head to a certain position above the disk.

* * * * *